United States Patent [19]

Nishina

[11] Patent Number: 5,781,324
[45] Date of Patent: Jul. 14, 1998

[54] OPTICAL SCANNING LENS AND OPTICAL SCANNER

[75] Inventor: Kiichiro Nishina, Yokohama, Japan

[73] Assignee: Ricoh Company, Ltd., Tokyo, Japan

[21] Appl. No.: 826,100

[22] Filed: Mar. 24, 1997

[30] Foreign Application Priority Data

Mar. 22, 1996 [JP] Japan ................................. 8-065890

[51] Int. Cl.$^6$ .................................................. G02B 26/08
[52] U.S. Cl. .......................... 359/206; 359/205; 359/207; 359/216; 359/662; 359/711; 359/717; 359/718; 359/784; 359/793
[58] Field of Search ................................. 359/205–207, 359/212–219, 662, 708, 711, 716–718, 784, 791–794; 347/258–261

[56] References Cited

U.S. PATENT DOCUMENTS

| | | | |
|---|---|---|---|
| 4,712,884 | 12/1987 | Sakuma et al. | 359/206 |
| 4,738,517 | 4/1988 | Nishina et al. | |
| 4,753,522 | 6/1988 | Nishina et al. | |
| 4,770,517 | 9/1988 | Sakuma | 359/206 |
| 4,789,230 | 12/1988 | Ohta | |
| 4,836,664 | 6/1989 | Nishina | |
| 4,997,265 | 3/1991 | Nishina | |
| 5,005,928 | 4/1991 | Suzuki et al. | 359/206 |
| 5,311,364 | 5/1994 | Kanoshima et al. | |
| 5,508,810 | 4/1996 | Sato | |

*Primary Examiner*—James Phan
*Attorney, Agent, or Firm*—Oblon, Spivak, McClelland, Maier & Neustadt, P.C.

[57] ABSTRACT

An optical scanning lens is provided with a lens configuration for focusing and correction of field curvature and scanning speed of a deflected laser beam. The lens configuration includes a meniscus lens and a positive meniscus lens sequentially aligned and sharing an optical axis with the optical scanning lens. Specific parameters are provided for each lens in order to satisfy the relationship:

$$-0.25 < f_2/f_1 < 0.11,$$

between respective focal lengths of the lenses, and the surfaces of the meniscus lens have radii of curvature satisfying the relationship:

$$0.8 < r_1/r_2 < 1.25.$$

The above relationships provide for correction of scanning speed and field curvature in a main scanning direction. Specific lens surfaces are identified and provided with an aspheric surface which provides additional field curvature correction in the main scanning direction. A face inclination lens is provided that corrects field curvature in a sub scanning direction and corrects for inclination of the laser beam caused by imperfect reflecting surfaces of a deflector that is deflecting the laser beam. The optical scanning lens is ideally suited for use in a laser scanning device such as a laser printer.

33 Claims, 15 Drawing Sheets

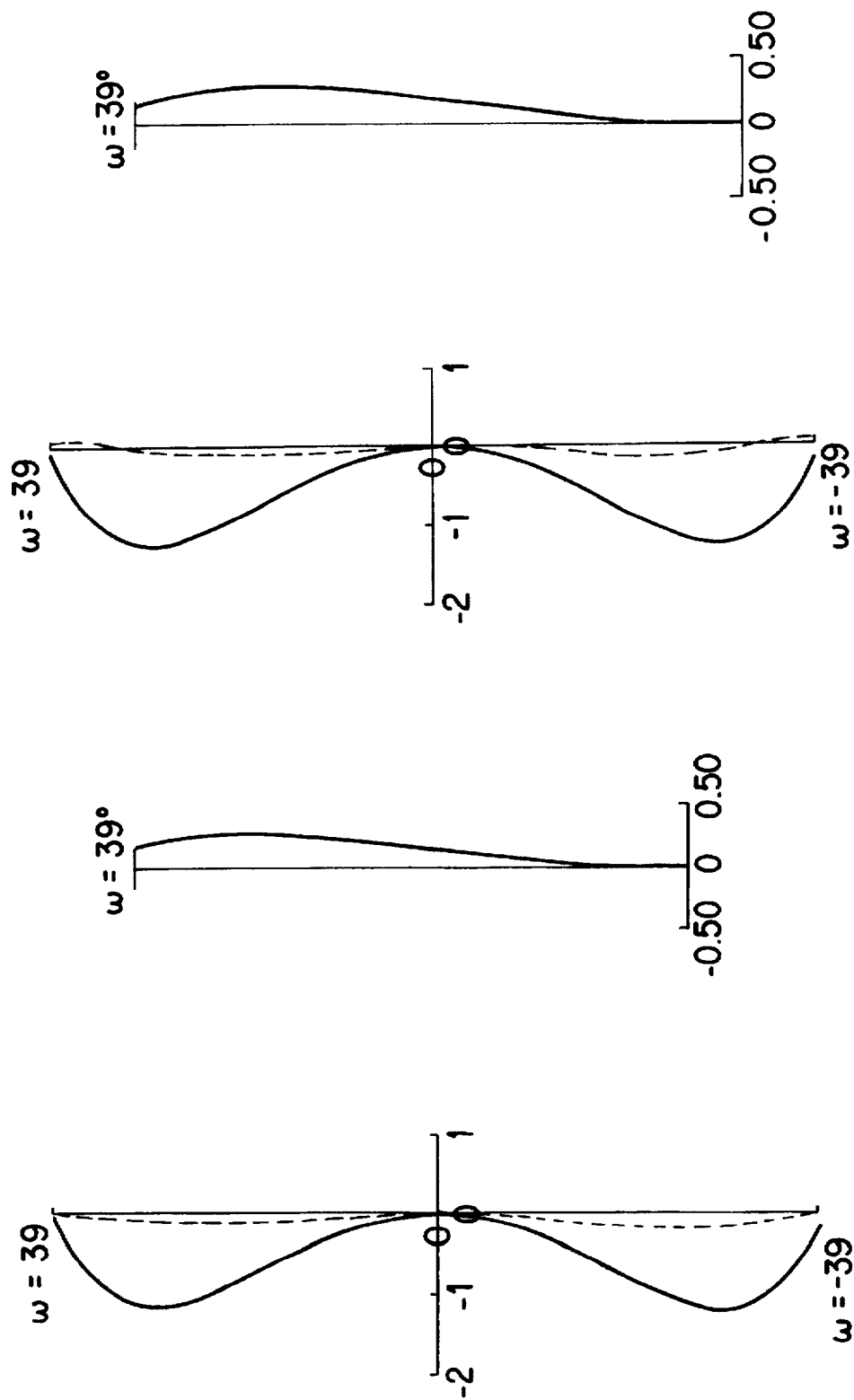

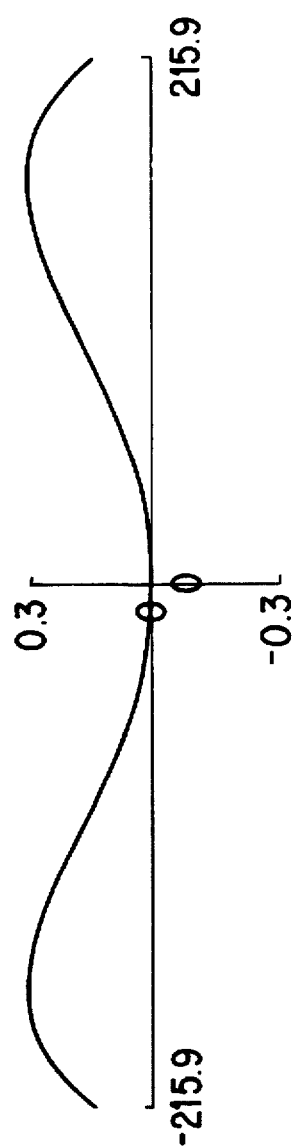
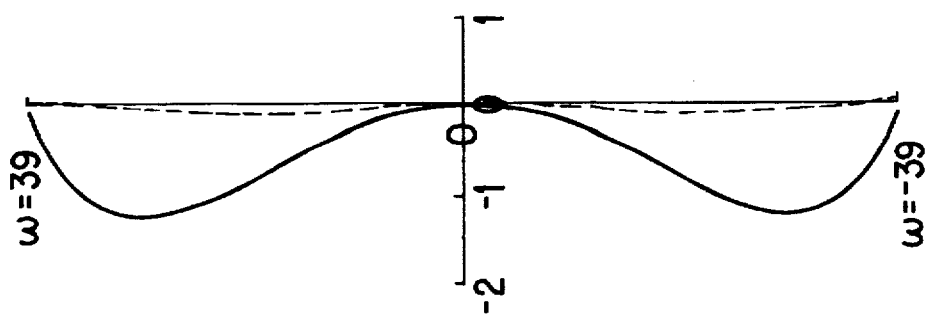
FIG. 9B
FIG. 9A

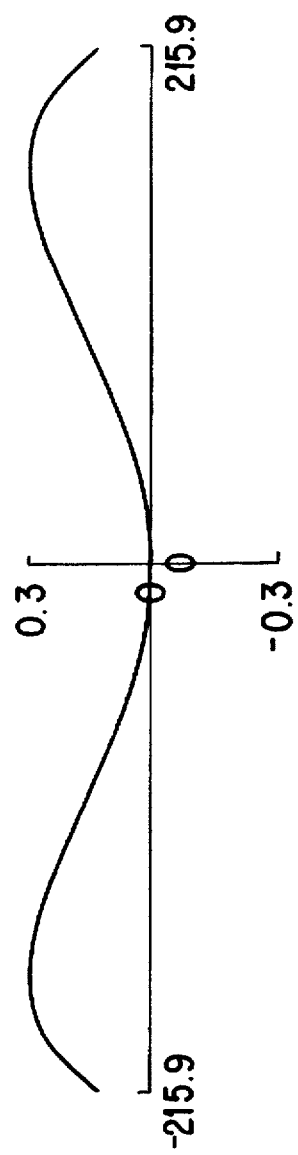
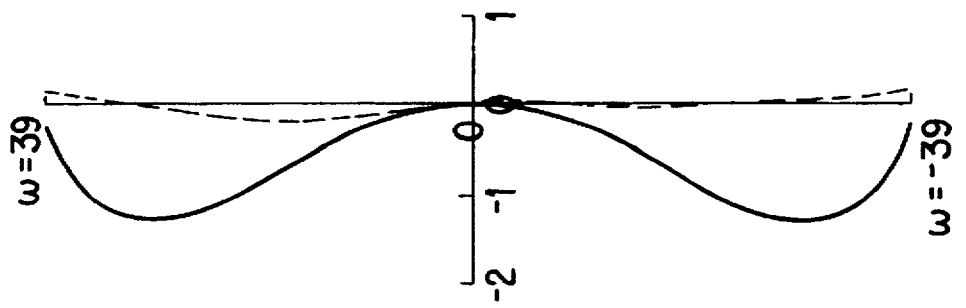

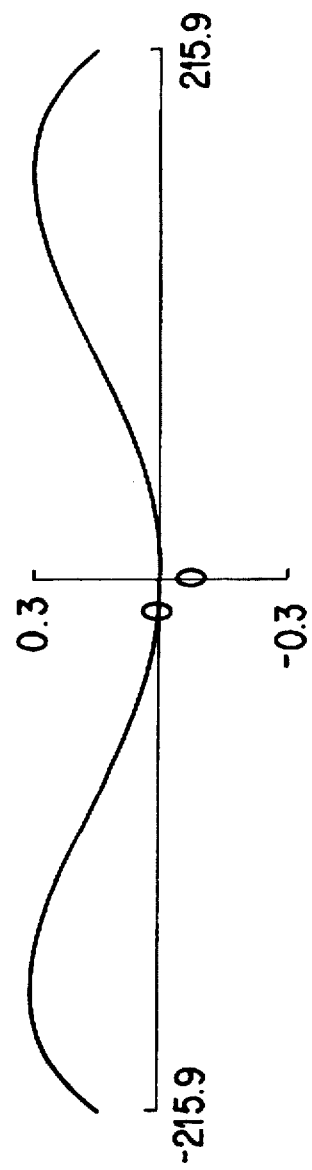
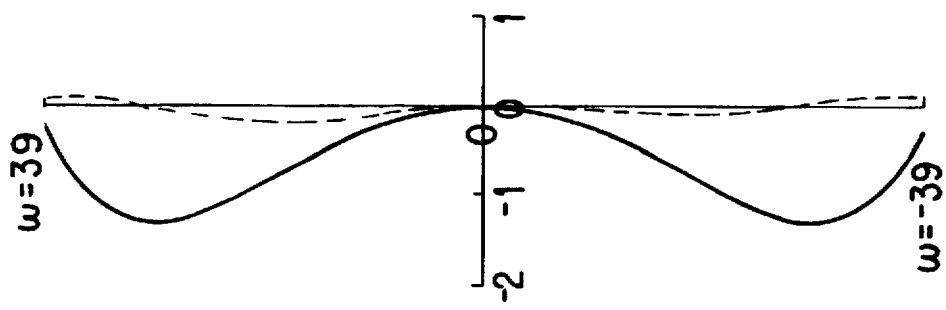
FIG. 11B
FIG. 11A

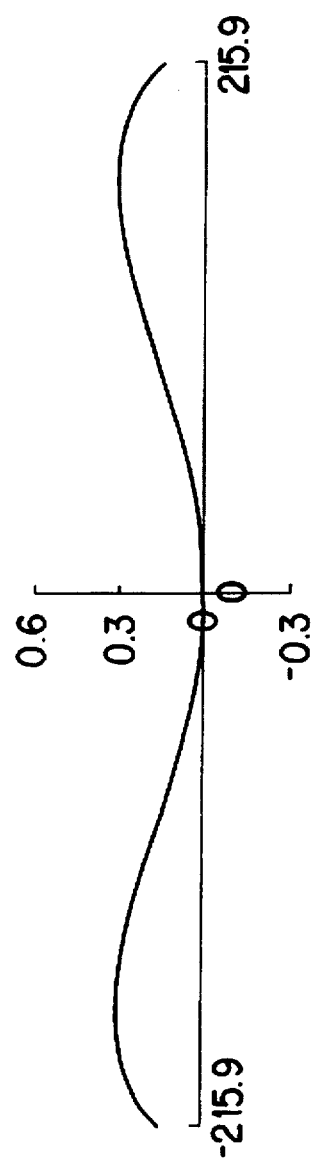
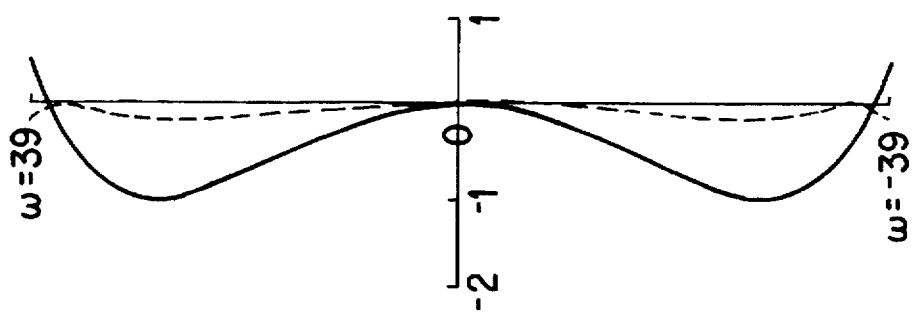
FIG. 12B
FIG. 12A

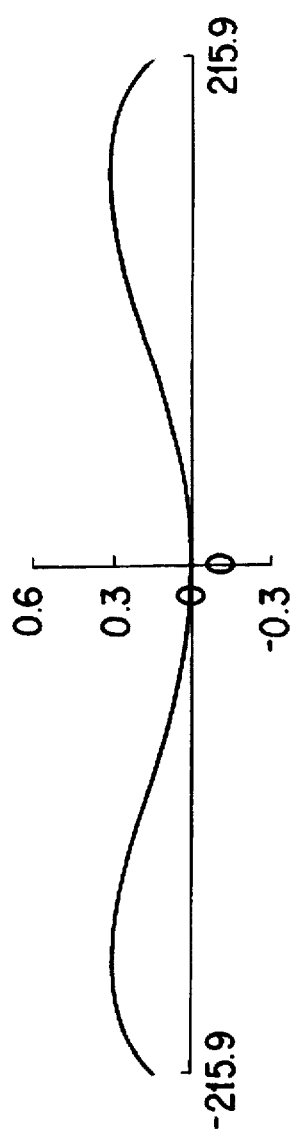
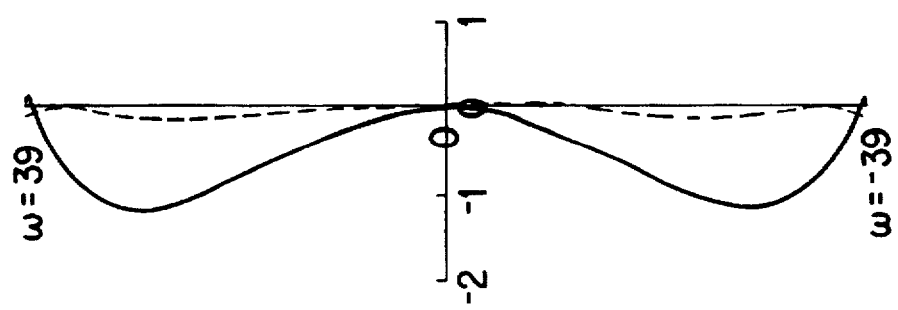
FIG. 13B
FIG. 13A

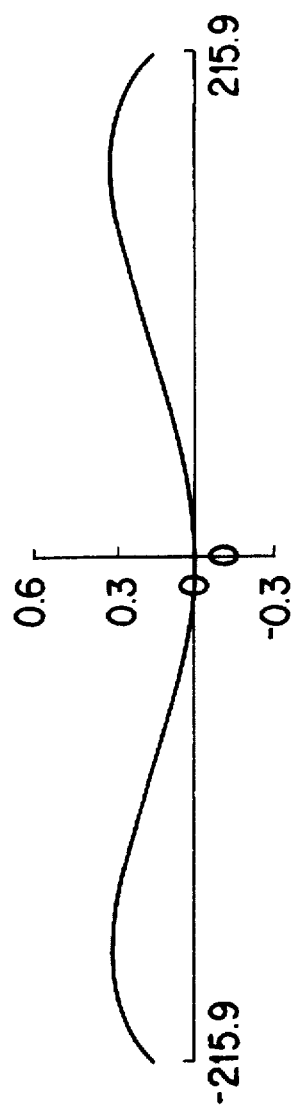
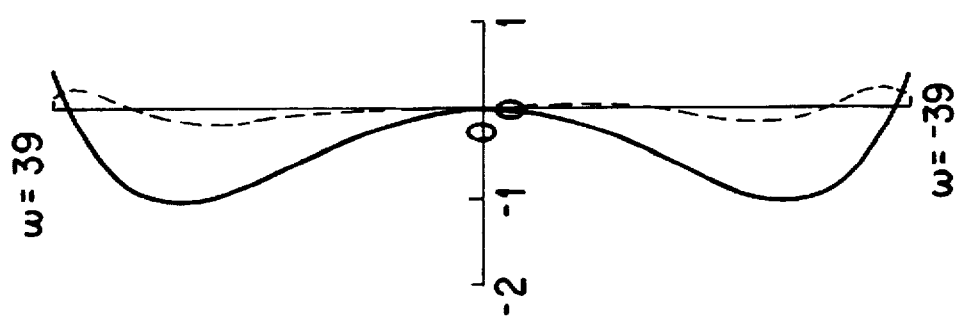
FIG. 15B
FIG. 15A

OPTICAL SCANNING LENS AND OPTICAL SCANNER

CROSS REFERENCES TO RELATED APPLICATIONS

This application claims priority to Japanese Patent Application 8-065890 filed Mar. 22, 1996 which is incorporated herein by reference.

BACKGROUND OF THE INVENTION

1. Field of the Invention

This invention relates to an optical scanning lens. The invention is further related to an optical scanning lens for focusing a laser beam onto a surface of a subject to be scanned. The invention is more particularly related to an optical scanning lens including an fθ function and for correcting field curvature across a scan area of a focused laser beam. The invention is also related to an optical scanning lens with the above properties used in an image forming apparatus such as a copier, fax machine, or laser printer.

2. Discussion of the Background

Modern image forming and scanning apparatuses utilize components that are well-known, including a laser source for the production of a laser beam, optical lenses for focusing the laser beam and an assortment of mirrors for directing the laser beam. In the case of an image forming apparatus such as a laser printer, the laser beam is directed and focused onto a photoconductive drum to form an image. The image is then transferred from the photoconductive drum to paper.

In a typical laser apparatus, the laser beam is directed and focused longitudinally across a subject material (a photoconductive drum in the case of a laser printer). This is performed by first emitting the laser toward a rotating polygonal mirror. The laser beam strikes a surface of the rotating polygonal mirror and is deflected toward optical lenses which focus the laser beam. Since the polygonal mirror is rotating, the laser beam is continually reflected at different angles which corresponds to longitudinal movement in a main scanning direction across a surface of the subject material.

A laser device can be made more compact if an angular projection of the laser beam is increased after deflection from the rotating polygonal mirror. The angular projection of a laser beam is increased by the optical lenses via a function of the optical lenses known as an fθ function.

The term fθ function is named because a light beam incident at angle θ to an optical axis of an optical lens is projected to and focused at a focal length f from the optical lens at a distance f×θ from the optical axis. A strong fθ function in an optical lens increases the angular projection of light focused by the optical lens.

Therefore, the advantage to a printing or scanning device that incorporates an optical lens with a strong fθ function is that the light path between the optical lens and the subject item can be decreased because the increased angular projection allows a width of the subject item to be scanned with a shorter focal length. A shorter focal length means that the apparatus can be made smaller in size.

However, additional problems occur when optical lenses with an increased fθ function are utilized. One problem that occurs is that a scan speed of the focused laser beam across the subject item varies according to distance from the optical axis. This is because the polygonal mirror rotates at a constant angular velocity and the distance from the optical axis at which the laser beam is focused is a multiple of the incident angle and focal length (f×θ as described above). Therefore, if an angle of incidence is small with respect to the optical axis, the laser beam is focused on the subject item at small distances from the optical axis per unit of time. However, at larger angles of incidence, the laser beam is focused on the subject item at progressively larger distances per unit of time. This increased distance correlates to an increased speed at which the focused laser beam travels across subject item. Because the speed at which the focused laser beam travels is not constant, variations in print and/or scan quality results.

Another problem that results from a typical optical lens arrangement is that the field curvature of the optical lens causes variations in the size of the focused laser beam striking the subject item. The field curvature of the optical lens results because the best focus of the laser beam actually occurs on a curved surface. Since the subject item is flat, such as one longitudinal line of a photoconductive drum being scanned, the field curvature causes the focused laser beam to vary in diameter depending on distance from the curved surface of best focus. Therefore, correcting field curvature makes scanning or printing on a subject item more consistent.

The above problems relating to laser beam focused by optical lenses including fθ characteristics are well-known. The above described problems are the subject of numerous U.S. and foreign patents including Ohta (U.S. Pat. No. 4,789,230).

In Ohta, there is disclosed optical lenses of specific dimensions so as to minimize variations in the scanning speed of the focused laser beam. Ohta teaches a combination including a meniscus and plano-convex lens to provide for focusing a deflected laser beam. However, the above cited problems are difficult to overcome, and the teachings of Ohta do not completely eliminate the above cited problems.

SUMMARY OF THE INVENTION

The present inventor has realized that a specific lens combination is better suited for focusing a deflected laser beam than that which presently exists. The present inventor has realized improved optical properties relating to the construction and placement of optical lenses utilized in focusing a deflected laser beam, improving the quality of scanning or printing by minimizing the above described problems.

The present inventor has also realized that a problem of face inclination occurs when a laser beam is deflected from a rotating polygonal mirror. Face inclination occurs because the rotating polygonal mirror is not constructed perfectly and exhibits an inclination. The present inventor has also realized that face inclination is best corrected by a specialized lens arrangement.

Accordingly, it is an object of this invention to provide a set of optical lenses for focusing a laser beam on a subject item.

It is another object of the invention to provide a set of optical lenses exhibiting minimum field curvature and having optical properties for correcting face inclination and scan speed of a deflected laser beam.

It is another object of the present invention to provide a set of optical lenses for correcting and focusing a laser beam deflected from a rotating polygonal mirror in a scanning or printing apparatus.

These and other objects are accomplished by an optical scanning lens that exhibits an fθ function and corrects field curvature in a main scanning direction. The optical scanning lens is constructed from a meniscus lens and a positive meniscus lens arranged sequentially along an optical axis of the optical scanning lens. The meniscus lens and positive meniscus lens exhibit a suitable fθ function and correct field curvature in a main scan direction when the focal lengths $f_1$ and $f_2$ respectively satisfy the relationship:

$$-0.25 < f_2/f_1 < 0.11,$$

and surfaces of the meniscus lens have radii of curvature ($r_1$ and $r_2$ respectively along the optical axis) satisfying the relationship:

$$0.8 < r_1/r_2 < 1.25.$$

The above relationships can be met by any number of physical characteristics of the meniscus and positive meniscus lenses such as lens surface radius of curvature, refractive indices, lens thicknesses, distances between the lenses, and distance between the optical scanning lens and a light source to be focused, for example. In one embodiment, a deflector is provided which deflects a light source into the optical scanning lens. Specific values for curvature, indices, thicknesses, and distances are provided. The resulting optical scanning lens provides an advantageous fθ function and corrected field curvature in a main scanning direction.

In another embodiment, the optical scanning lens is provided with a face inclination lens arranged sequentially after the positive meniscus lens and sharing the same optical axis as the optical scanning lens. The face inclination lens corrects face inclination of a surface of the deflector. The face inclination lens is a barrel shaped torroidal lens. In addition to correcting face inclination, the face inclination lens also corrects field curvature in a sub scanning direction perpendicular to the main scanning direction.

In several embodiments, an aspherical face is provided for one or more lens surfaces of the meniscus lens and/or the positive meniscus lens. In lens design, an aspherical face is determined by rotating a curve around an axis of the lens. The aspherical surface of specific lens surfaces improves field curvature more in a main scanning direction as compared to a purely spherical surface.

In alternative embodiments, either the meniscus lens or both the meniscus lens and the positive meniscus lens are constructed of a plastic material.

In a final embodiment, the optical scanning lenses in the above described embodiment are provided as part of a laser scanning device, preferably a laser printer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6A and 6B are graphs respectively representing field curvature and an fθ function of a first embodiment of the present invention;

FIGS. 7A and 7B are graphs respectively representing field curvature and an fθ function of a second embodiment of the present invention;

FIGS. 9A and 9B are graphs respectively representing field curvature and an fθ function of a fourth embodiment of the present invention;

FIGS. 10A and 10B are graphs respectively representing field curvature and an fθ function of a fifth embodiment of the present invention;

FIGS. 11A and 11B are graphs respectively representing field curvature and an fθ function of a sixth embodiment of the present invention;

FIGS. 12A and 12B are graphs respectively representing field curvature and an fθ function of a seventh embodiment of the present invention;

FIGS. 13A and 13B are graphs respectively representing field curvature and an fθ function of a eighth embodiment of the present invention;

FIGS. 15A and 15B are graphs respectively representing field curvature and an fθ function of a tenth embodiment of the present invention.

DESCRIPTION OF THE PREFERRED EMBODIMENTS

Figure 1:
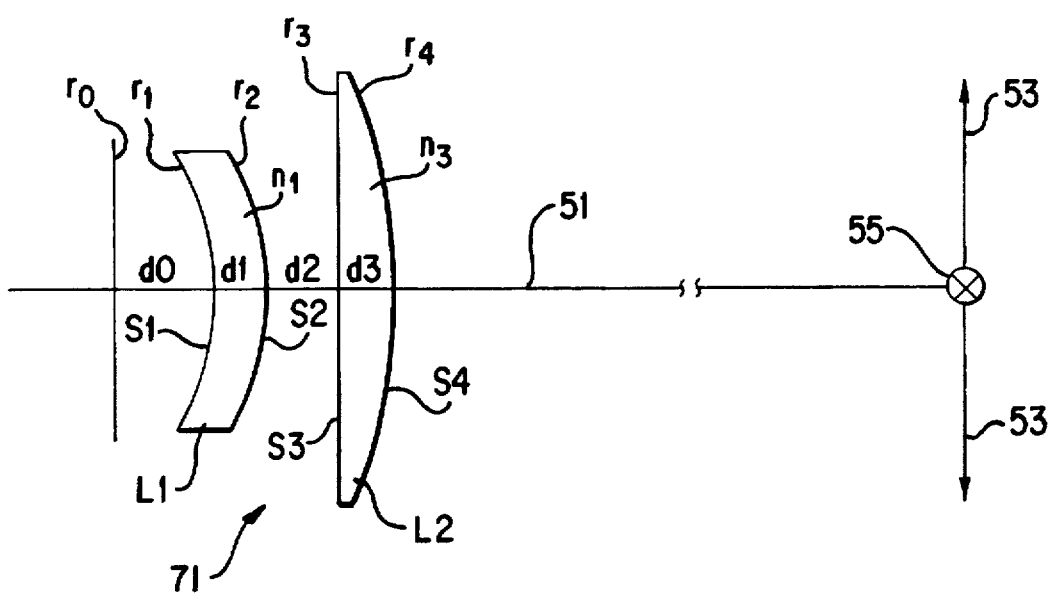
FIG. 1 is an arrangement of an optical scanning lens including a meniscus lens and a positive meniscus lens.

Referring now to the drawings, wherein like reference numerals designate identical or corresponding parts throughout the several views, and more particularly to FIG. 1 thereof, there is illustrated an optical scanning lens 71 with two components, a meniscus lens L1, and a positive meniscus lens L2. In FIG. 1, the meniscus lens L1 has a first optical surface S1 having a radius of curvature $r_1$ and a second optical surface S2 having a radius of curvature $r_2$. Similarly, the positive meniscus lens L2 is shown having a first optical surface S3 with a radius of curvature $r_3$ and a second optical surface S4 and corresponding radius of curvature of $r_4$.

The meniscus lens L1 and the positive meniscus lens L2 have thicknesses along an optical axis 51 of d1 and d3 respectively. Both the meniscus lens L1 and the positive meniscus lens L2 are composed of materials to exhibit an index of refraction $n_1$ and $n_2$ respectively. FIG. 1 also illustrates a distance d0 between a deflector (not shown) and optical surface S1, and a distance d2 between surface S2 and S3.

In the optical scanning lens 71, each lens has a focal length, a distance from a principal plane (not shown) of the lens to a point where light exiting the lens is focused. The respective focal lengths of the meniscus lens L1 and the positive meniscus lens L2 are respectively $f_1$ and $f_2$ (not shown).

Also shown in FIG. 1, at an approximate combined focal distance of the meniscus lens L1 and positive meniscus lens L2 is a main scanning direction 55 which lies on an equatorial plane of the optical scanning lens 71 and is a line perpendicular to the plane of the drawing sheet. A subscanning direction 53 is shown in a meridional plane perpendicular to the main scanning direction 55.

The principle purpose of the optical scanning lens 71 is to provide an fθ function such that light entering the optical scanning lens 71 can be focused at an appropriate distance from the optical axis 51, and to correct field curvature so that a spot diameter (not shown) of a light focused by the optical scanning lens 71 does not vary significantly from point to point, thereby maintaining high resolution. The -present inventor has found that the above purposes are met by the optical scanning lens 71 in the above configuration and according to a first, second, and third embodiment of the present invention when the focal length $f_1$ of the meniscus lens L1, and the focal length $f_2$ of the positive meniscus lens satisfy the relationship:

$$-0.25 < f_2/f_1 < 0.11, \quad (1)$$

and the radii of curvature for each surface (S1 and S2) of the meniscus lens ($r_1$ and $r_2$ respectively) satisfy the relationship:

$$0.8 < r_1/r_2 < 1.25. \quad (2)$$

In the first embodiment, an $f_2/f_1$ focal length ratio of −0.0286 is identified with focal lengths $f_1$ and $f_2$ of −11926.8 and 340.8 respectively, and an $r_1/r_2$ radius of curvature ratio of 0.89 is found when the optical scanning lens 71 of FIG. 1 has the properties shown in Table 1. Table 1 includes columns for $r_i$, $d_i$, and $n_i$ which respectively identify radius of curvature, distance, and index of refraction for each value of an index, and corresponding to the same elements identified for the optical scanning lens 71 as shown in FIG. 1.

In Table 1, indices of refraction for $n_0$, $n_2$, and $n_4$ are left blank indicating an index of refraction of air which is 1. Radius $r_0$ of ∞ indicates a flat mirrored reflecting surface (see reflecting surface 65 in FIG. 2 as explained below, for example).

The overall characteristics including focal length f, a resultant focal length from the combination of the meniscus lens L1 and the positive meniscus lens L2, ω, and h are also identified.

TABLE 1

| f = 316.7 | ω = 39° | | h = 216 |
|---|---|---|---|
| i | $r_i$ | $d_i$ | $n_i$ |
| 0 | ∞ | 45.001 | |
| 1 | −121.551 | 32.5 | 1.60909 |
| 2 | −136.131 | 9.654 | |
| 3 | −2414.464 | 43.845 | 1.71117 |
| 4 | −221.894 | | |

Similar to the first embodiment illustrated in Table 1, Table 2 illustrates the properties of the second embodiment having a focal length $f_1$=7396.6 and $f_2$=354.1, the resulting $f_2/f_1$ ratio equivalent to 0.048, and an $r_1/r_2$ ratio equal to 0.95.

TABLE 2

| f = 316.6 | ω = 39° | | h = 216 |
|---|---|---|---|
| i | $r_i$ | $d_i$ | $n_i$ |
| 0 | | 45.0 | |
| 1 | −117.406 | 24.1 | 1.60909 |
| 2 | −123.315 | 37.1 | |
| 3 | −3950.0 | 24.4 | 1.71117 |
| 4 | −237.362 | | |

Similarly, Table 3 illustrates values for the third embodiment in which $f_1$=7363.8 and $f_2$=353.8, the resulting $f_2/f_1$ ratio being 0.048, and an $r_1/r_2$ ratio of 0.96.

TABLE 3

| f = 316.7 | ω = 39° | | h = 216 |
|---|---|---|---|
| i | $r_i$ | $d_i$ | $n_i$ |
| 0 | | 45.0 | |
| 1 | −119.706 | 24.989 | 1.57210 |
| 2 | −125.241 | 36.409 | |
| 3 | −3754.779 | 24.578 | 1.71117 |
| 4 | −236.459 | | |

The present inventor has also determined that the above cited fθ function and field curvature correction are obtained by the optical scanning lens 71 according to the fourth through tenth embodiments which satisfy the relationship:

$$-0.02 < f_2/f_1 < 0.36 \quad (3)$$

and an $r_1/r_2$ ratio $$0.85 < r_1/r_2 < 1.25. \quad (4)$$

According to the fourth embodiment, the above relationships are satisfied when a focal length $f_1$=7370.4 and $f_2$=356.8, the resulting $f_2/f_1$ ratio being 0.048, and the lens characteristics and distances shown in Table 4 are also present. Further, in this embodiment the meniscus lens L1 is preferably made of plastic, as explained above, although glass or other material may be used, if desired.

TABLE 4

| f = 316.7 | ω = 39° | | h = 215.9 |
|---|---|---|---|
| i | $r_i$ | $d_i$ | $n_i$ |
| 0 | | 47.71 | |
| 1 | −120.0 | 27.75 | 1.57210 |
| 2 | −126.5 | 32.3 | |
| 3 | −4747.9 | 20.5 | 1.71117 |
| 4 | −241.3 | | |

In addition to the immediately preceding focal length and radius of curvature ratios, the present inventor has determined that an aspherical face provided to certain lens surfaces of the optical scanning lens 71 improves field curvature more in the main scanning direction 53 as compared to embodiments having a spherical face. Therefore, the inventor has provided values needed to define an aspherical face for specific lenses in the various embodiments following the above cited $f_2/f_1$ and $r_1/r_2$ relationships.

To determine an aspherical surface for a lens, such as the meniscus lens L1, a radius of curvature, r, a conical constant, K, and aspherical coefficients of higher order defining a curved surface are identified. Next, a coordinate system is set up including an X coordinate in conformity with the optical axis 51 shared by the meniscus lens L2 and optical scanning lens 71, and an H coordinate perpendicular to and designating a height from the optical axis 51. Finally, the aspherical surface is determined by rotating a curve, defined and represented by the following lens formula, around the optical axis 51.

$$X=(H^2/r)/[1+\sqrt{\{1-(1+K)(H/r)^2\}}]+AH^4+BH^6+CH^8+DH^{10}+ \ldots \quad (5)$$

In the lens formula, reference numerals A, B, C and D designate the aspherical coefficients of higher orders.

Thus, relating to the last identified $f_2/f_1$ and $r_1/r_2$ relationships in equations (3) and (4) respectively, the radii of curvature ($r_1, r_2, r_3$, and $r_4$), distances, and refractive indexes for embodiments 5–10 thereof are respectively shown in Tables 5A, 6A, 7A, 8A, 9A, and 10A similar to the description for the embodiment described in Table 1. Each of the embodiments 5–10 have a corresponding surface table 5B, 6B, 7B, 8B, 9B, and 10B respectively identifying one or more lens surfaces (see column labeled "Surface") of the optical scanning lens 71 having an aspherical surface. The corresponding Tables 5B–10B contain the conical constant (see column labeled K) and aspherical coefficients of higher order (see columns labeled A, B, C, and D) corresponding to the lens equation identified above.

TABLE 5A

| | f = 316.7 | ω = 39° | h = 215.9 |
|---|---|---|---|
| i | $r_i$ | $d_i$ | $n_i$ |
| 0 | | 45.0 | |
| 1 | −123.896 | 25.0 | 1.57210 |
| 2 | −134.162 | 27.653 | |
| 3 | −3209.37 | 31.0 | 1.71117 |
| 4 | −223.487 | | |

TABLE 5B

| Surface | K | A | B | C | D |
|---|---|---|---|---|---|
| 1 | 0.08762 | −4.31E−09 | −5.77E−12 | 4.51E−15 | −1.32E−18 |

TABLE 6A

| | f = 316.7 | ω = 39° | h = 215.9 |
|---|---|---|---|
| i | $r_i$ | $d_i$ | $n_i$ |
| 0 | | 45.023 | |
| 1 | −119.149 | 25.0 | 1.57210 |
| 2 | −127.232 | 29.0 | |
| 3 | −4056.57 | 30.071 | 1.71117 |
| 4 | −231.745 | | |

TABLE 6B

| Surface | K | A | B | C | D |
|---|---|---|---|---|---|
| 2 | 0.02613 | 6.57E−10 | 1.13E−12 | −2.88E−16 | 3.08E−20 |

TABLE 7A

| | f = 316.8 | ω = 39° | h = 215.9 |
|---|---|---|---|
| i | $r_i$ | $d_i$ | $n_i$ |
| 0 | | 54.075 | |
| 1 | −167.289 | 31.553 | 1.57210 |
| 2 | −170.463 | 33.535 | |
| 3 | −10000.0 | 22.332 | 1.57210 |
| 4 | −199.076 | | |

TABLE 7B

| Surface | K | A | B | C | D |
|---|---|---|---|---|---|
| 1 | 0.27453 | −6.53E−09 | 1.77E−12 | −9.31E−16 | −8.74E−20 |
| 3 | −329.6784 | −9.05E−11 | −1.10E−14 | −1.98E−18 | 3.28E−22 |

TABLE 8A

| | f = 316.8 | ω = 39° | h = 215.9 |
|---|---|---|---|
| i | $r_i$ | $d_i$ | $n_i$ |
| 0 | | 54.19 | |
| 1 | −149.836 | 31.879 | 1.57210 |
| 2 | −134.57 | 33.744 | |
| 3 | −10586.8 | 22.465 | 1.57210 |
| 4 | −243.123 | | |

TABLE 8B

| Surface | K | A | B | C | D |
|---|---|---|---|---|---|
| 1 | 0.23852 | −8.85E−09 | 2.51E−12 | −1.63E−15 | 5.96E−20 |
| 4 | 0.33977 | −3.11E−09 | −1.89E−14 | 4.00E−18 | −5.45E−22 |

TABLE 9A

| | f = 316.8 | ω = 39° | h = 215.9 |
|---|---|---|---|
| i | $r_i$ | $d_i$ | $n_i$ |
| 0 | | 54.077 | |
| 1 | −181.587 | 31.62 | 1.57210 |
| 2 | −187.665 | 33.567 | |
| 3 | −10000.0 | 22.36 | 1.57210 |
| 4 | −193.97 | | |

TABLE 9B

| Surface | K | A | B | C | D |
|---|---|---|---|---|---|
| 2 | −0.18515 | 7.56E−09 | −2.11E−13 | −5.59E−17 | 4.04E−20 |
| 3 | −1779.216 | 6.30E−10 | −3.59E−14 | −1.03E−17 | 1.01E−21 |

TABLE 10A f = 316.8    ω = 39°    h = 215.9

| i | $r_i$ | $d_i$ | $n_i$ |
|---|---|---|---|
| 0 |  | 54.19 |  |
| 1 | −182.315 | 31.591 | 1.57210 |
| 2 | −186.272 | 33.55 |  |
| 3 | −38824.2 | 22.352 | 1.57210 |
| 4 | −198.623 |  |  |

TABLE 10B

| Surface | K | A | B | C | D |
|---|---|---|---|---|---|
| 2 | −0.17857 | 6.42E−09 | −1.78E−12 | 2.69E−16 | 1.69E−20 |
| 4 | −0.00544 | −9.00E−11 | 1.01E−13 | 1.59E−17 | −1.75E−21 |

Figure 2:
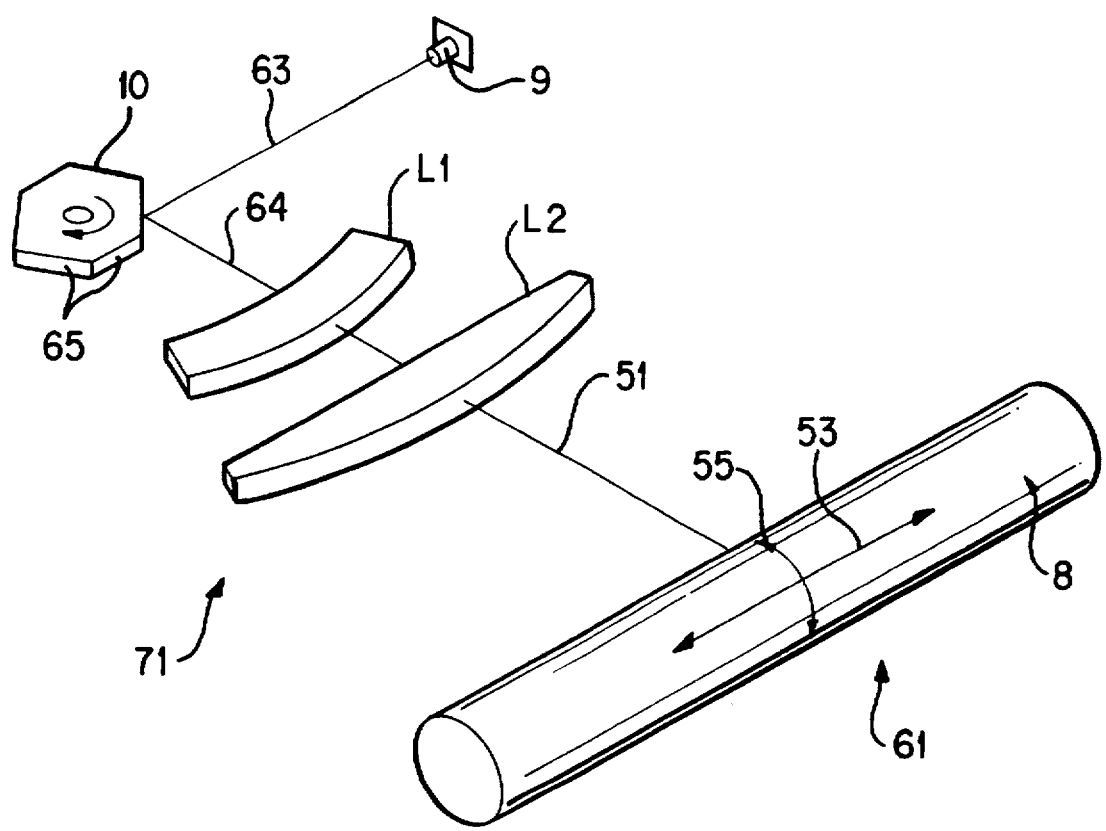
FIG. 2 illustrates the utilization of the optical scanning lens of the present invention in a laser scanning device.

In any of the above-described embodiments, as shown in FIG. 2, the optical scanning lens is utilized in a laser scanning apparatus 61 where a laser 9 emits a laser beam 63 toward a rotating polygonal mirror 10, also known as a deflector. The laser beam 63 then enters the optical scanning lens 71 as a deflected laser beam 64.

In FIG. 2, the deflected laser beam 64 is shown along the optical axis 51. The deflected laser beam 64 travels through the meniscus lens L1 and the positive meniscus lens L2 before striking a photoconductive drum 8. The main scanning direction 53 and the sub scanning direction 55 are illustrated on the photoconductive drum 8.

Figure 3:
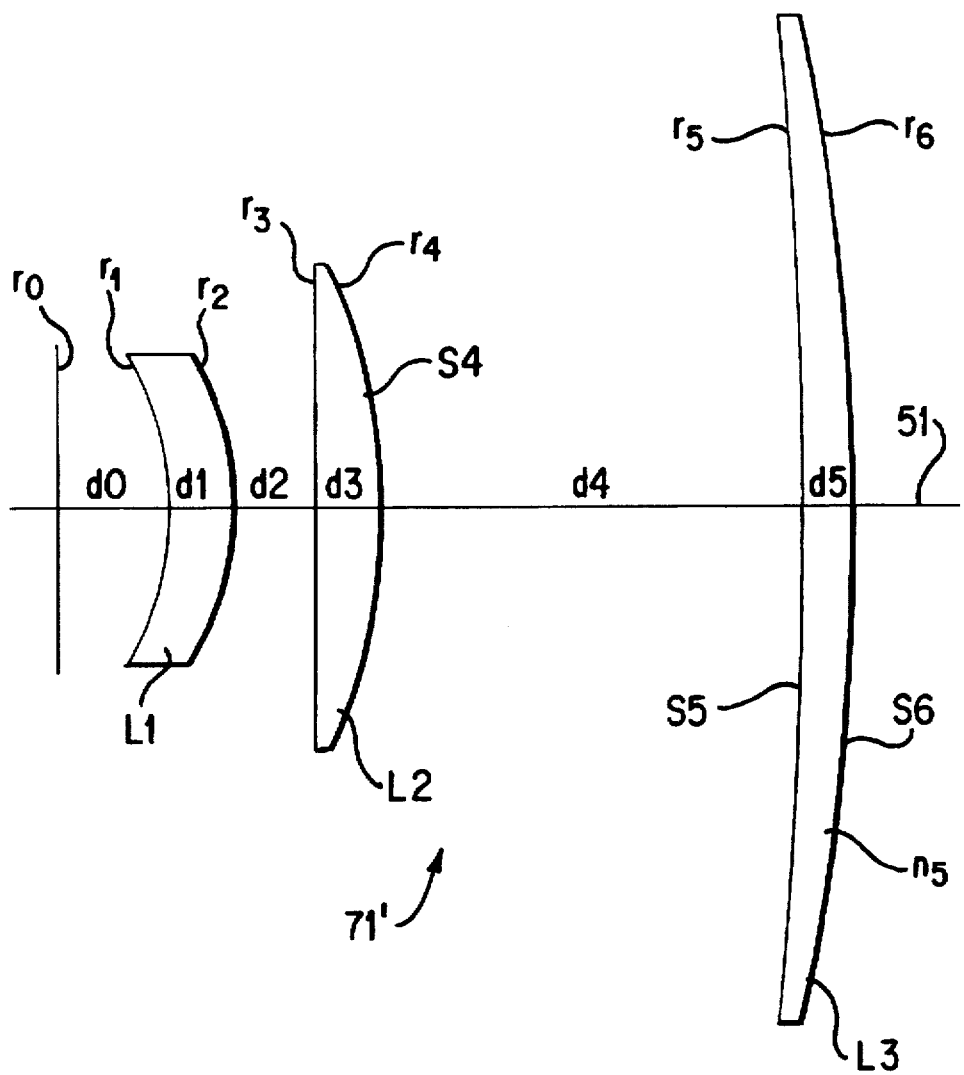
FIG. 3 illustrates an optical scanning lens arrangement including a meniscus lens, a positive meniscus lens, and a face inclination lens.

FIG. 3 illustrates an optical scanning lens 71' incorporating the face inclination lens L3 and the distances, thicknesses, and indices of refraction relating to the optical scanning lens 71'. The face inclination lens L3 is a barrel-shaped torroidal lens having two surfaces S5 and S6 and an index of refraction $n_5$. The barrel torroidal shape of the face inclination lens L3 has the additional effect of improving field curvature in the sub scanning direction 55.

Figure 4:
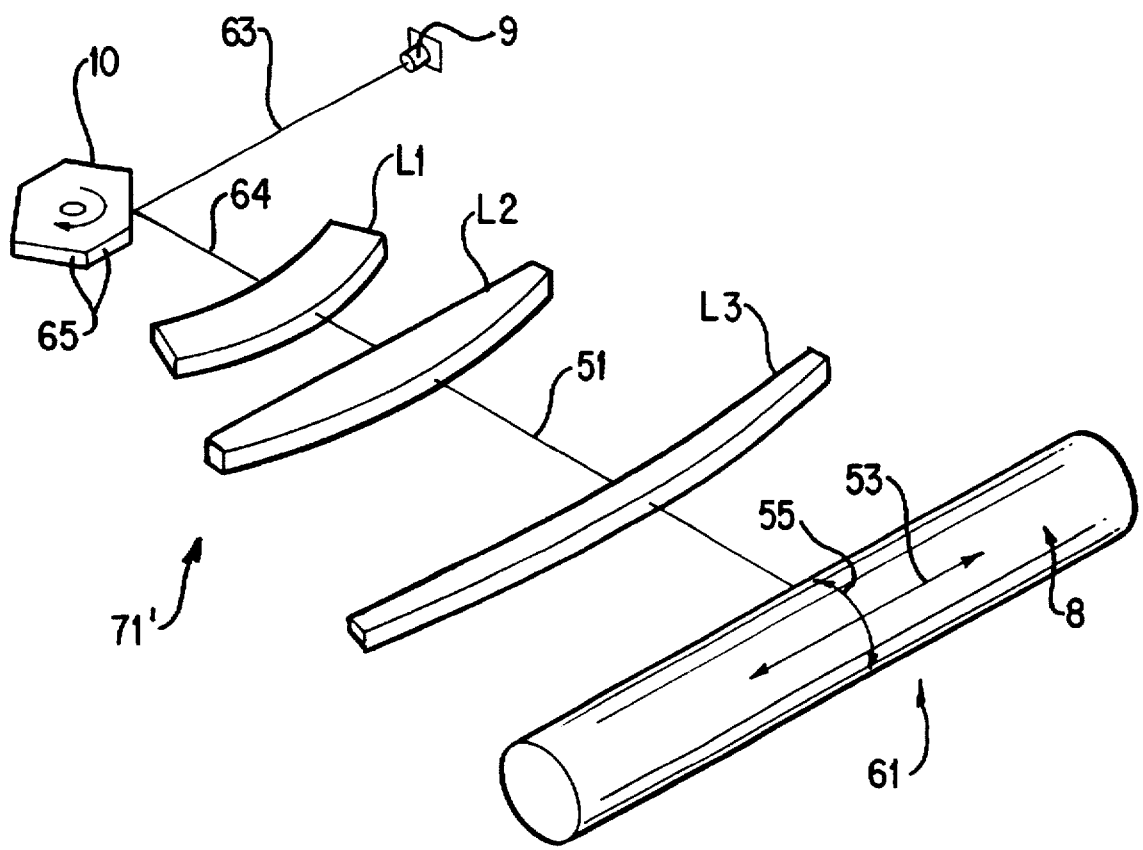
FIG. 4 illustrates the utilization of the optical scanning lens illustrated in FIG. 3 of the present invention in a laser scanning device.

In FIG. 4, a face inclination lens L3 is utilized to correct a face inclination (not shown) of a reflecting surface 65 of the rotating polygonal mirror 10, and to correct field curvature in the sub scanning direction 55. The deflected laser beam 64 travels along optical axis 51 through the optical scanning lens 71' including the face inclination lens L3 and then striking the photoconductive drum 8.

Figure 5A:
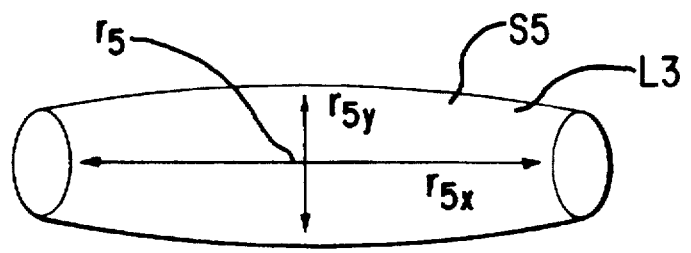
FIG. 5A and 5B respectively illustrate a first surface and a second surface of a face inclination lens having a torroidal shape according to the present invention.
Figure 5B:
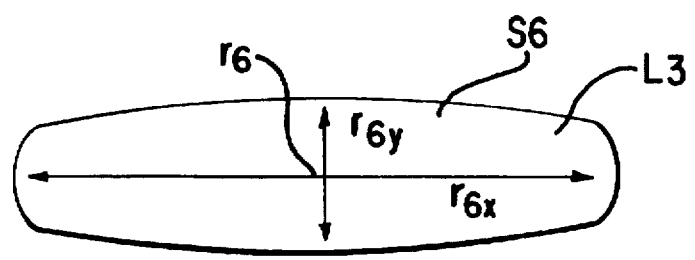
Figure 8B:
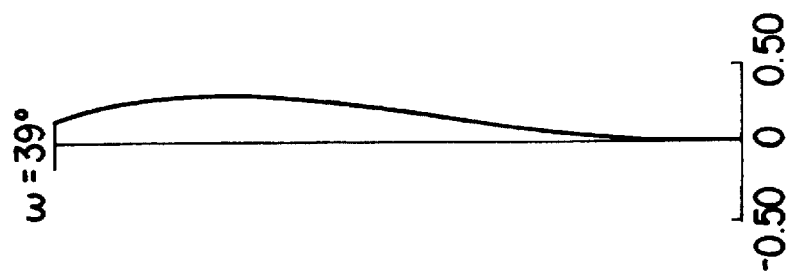
FIGS. 8A and 8B are graphs respectively representing field curvature and an fθ function of a third embodiment of the present invention.
Figure 8A:
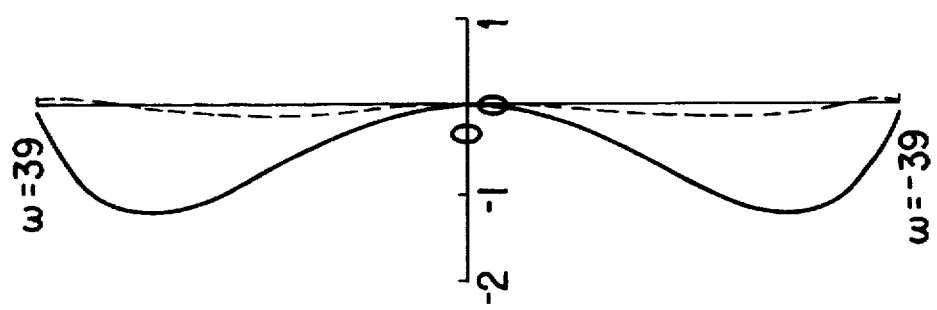
Figures 14A, 14B:
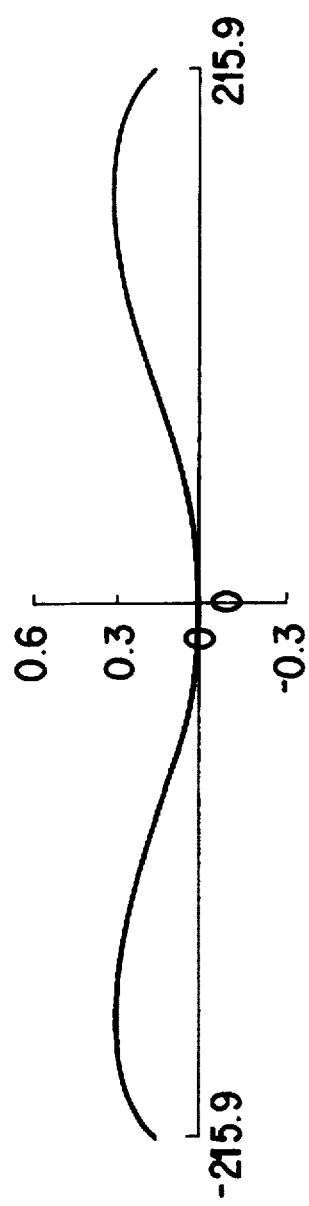
FIGS. 14A and 14B are graphs respectively representing field curvature and an fθ function of a ninth embodiment of the present invention.

The face inclination lens L3 is further illustrated in FIGS. 5A and 5B respectively showing the surfaces S5 and S6.

As shown in FIG. 5A, a radius of curvature $r_5$ of surface S5 of the face inclination lens L3 is shown on perpendicular axes $r_{5x}$ and $r_{5y}$. As shown in FIG. 5B a radius of curvature $r_6$ of surface S6 of the face inclination lens L3 is also shown on two similar perpendicular axes $r_{6x}$ and $r_{6y}$. The separate respective dual axes shown for radius or curvature $r_5$ and $r_6$ are needed to define the torroidal shape of the face inclination lens L3 having independent non-spherical lens surfaces.

The face inclination lens L3 is appropriately utilized in each of the above described embodiments of the optical scanning lens 71. For embodiments 1, 2 and 3 above, Table 11A is provided wherein values $r_{5x}$, $r_{5y}$ and $r_{6x}$, $r_{6y}$ are provided to define the radii of curvature relating to surfaces S5 and S6 of the additionally utilized face inclination lens L3. In addition, Table 11A specifies a thickness d5 of the face inclination lens L3 along the optical axis 51, and an index of refraction $n_5$. Table 11B provides a distance d4 which represents a distance between surface S4 of the positive meniscus lens L2 and surface S5 of the face inclination lens for each of embodiments 1, 2 and 3.

TABLE 11A

| i | $r_{ix}$ | $r_{iy}$ | $d_i$ | $n_i$ |
|---|---|---|---|---|
| 5 | −700.0 | −83.64 | 3.0 | 1.57221 |
| 6 | −700.0 | −39.74 |  |  |

TABLE 11B

| embodiment | d4 |
|---|---|
| 1 | 220.0 |
| 2 | 208.0 |
| 3 | 208.0 |

For embodiments 4–10 above, Table 12A similarly identifies the values $r_{5x}$, $r_{5y}$ and $r_{6x}$, $r_{6y}$ defining the radii of curvature relating to surfaces S5 and S6, thickness d5, and index of refraction $n_5$ for the addition of the face inclination lens L3 to the optical scanning lens 71. Similar to Table 11B, Table 12B illustrates a distance d4 between the surface S4 of the positive meniscus lens L2 and a surface S5 of the face inclination lens L3.

TABLE 12A

| i | $r_{ix}$ | $r_{iy}$ | $d_i$ | $n_i$ |
|---|---|---|---|---|
| 5 | −700.0 | −83.0 | 3.0 | 1.57221 |
| 6 | −700.0 | −39.74 |  |  |

TABLE 12B

| embodiment | d4 |
|---|---|
| 4 | 210.6 |
| 5 | 209.4 |
| 6 | 209.0 |
| 7 | 206.0 |
| 8 | 198.8 |
| 9 | 205.5 |
| 10 | 204.5 |

For each embodiment of the optical scanning lens 71 as defined in Tables 11A, 11B and 12A, 12B there results a field curvature and fθ function highly suitable for use in the image forming apparatus 61. For the embodiment relating to Table 1, FIGS. 6A and 6B respectively illustrate a resulting field curvature and fθ function.

In FIG. 6A, a graph represents field curvature on a horizontal axis respective of ω, of a laser (deflected laser beam 64, for example) for the optical scanning lens 71', on a vertical axis. Field curvature in the main scanning direction 55 is represented by a broken line, and field curvature in the subscanning direction 53 is represented by a solid line. In FIG. 6B, the fθ function is similarly represented by a solid line.

Similar to the embodiment relating to Table 1 and FIGS. 6A and 6B, the field curvature and fθ function for embodiments 2–10 are respectively illustrated in FIGS. 7A/7B, 8A/8B, 9A/9B, 10A/10B, 11A/11B, 12A/12B, 13A/13B, 14A/14B, and 15A/15B.

Plastic lenses may advantageously be used in the above described embodiments. Plastic lenses are lighter, less expensive and less likely to crack than glass based lenses.

Plastic has a disadvantage of being effected by heat. However, depending on location and other physical characteristics, certain lenses are less effected by heat. For example, when the focal length of a lens is large the lens tends to be more flat and both surfaces are more equivalent with regard to radii. Therefore the effects of heat are more equally distributed across each surface, and thus, the entire lens is less affected by heat.

Because the meniscus lens L1 is of a larger focal length, and therefore less affected by heat, L1 may advantageously be constructed of plastic. In tests, the present inventor has determined that in embodiments 4–6 the meniscus lens L1 is advantageously constructed of plastic. In embodiments 7–10, both the meniscus lens L1 and the positive meniscus lens L2 are advantageously constructed of plastic.

In each of the above described embodiments, the invention corrects field curvature and provides an fθ function highly suitable for A2 size paper.

Figure 16:
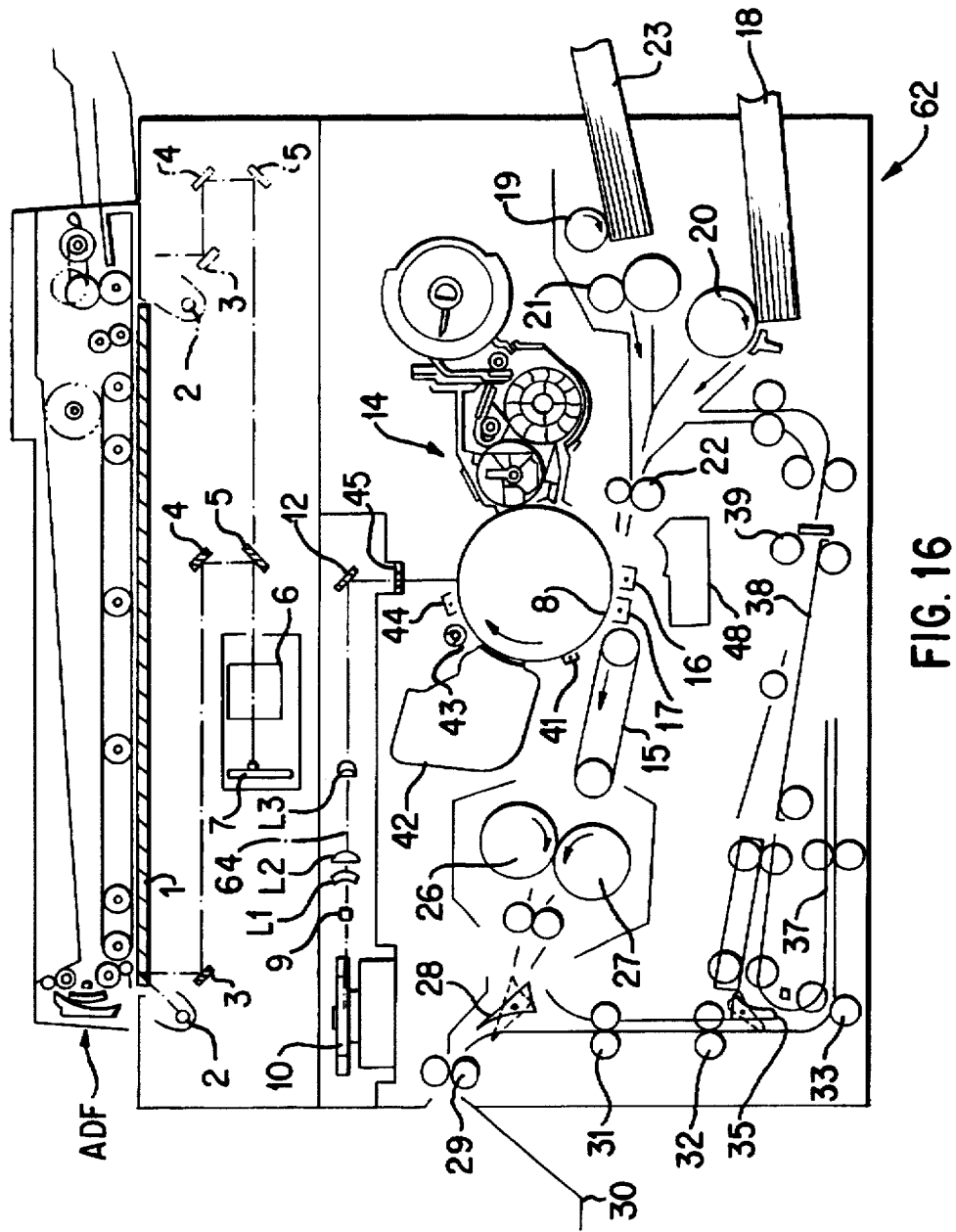
FIG. 16 illustrates a laser printing apparatus utilizing the optical scanning lens of the present invention.

FIG. 16 illustrates an embodiment of the present invention wherein the optical scanning lens 71 in any one of the embodiments described above is utilized in a laser printing apparatus 62. FIG. 16 shows the meniscus lens L1, the positive meniscus lens L2, and the face inclination lens L3 positioned in the laser printing apparatus 62 so as to focus the deflected laser beam 64 directed to the photoconductive drum 8.

In addition, the laser printing apparatus 62 of FIG. 16 further includes an automatic document feeder ADF, glass platen 1, lamp 2, first mirror 3, second mirror 4, third mirror 5, lens 6, image sensor 7, fourth mirror 12, developing unit 14, belt 15, transfer charger 16, separation charger 17, lower paper cassette 18, upper cassette feed roller 19, lower cassette feed roller 20, roller 21, register roller 22, upper paper cassette 23, fixing roller 26 and 27, pawls 28, exit roller 29, exit tray 30, additional rollers 31, 32, and 33, path selector pawl 35, turn passage 37, intermediate tray 38, feed roller 39, charger 41, cleaning unit 42, discharge lamp 43, main charger 44, dust glass 45, and transfer support device 48. The above-described elements work together to transfer an image on the photoconductive drum 8 to paper.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An optical scanning lens comprising:

a meniscus lens arranged along an optical axis of said optical scanning lens including a first surface having a radius of curvature $r_1$, and a second surface having a radius of curvature $r_2$; and a positive meniscus lens arranged along the optical axis of said optical scanning lens;

wherein:

said meniscus lens has a focal length of $f_1$, said positive meniscus lens is arranged sequentially after said meniscus lens and has a focal length of $f_2$, and said meniscus lens and said positive meniscus lens have an fθ function and correct a field curvature in a main scan direction, and satisfy the relationship:

$$-0.25 < f_2/f_1 < 0.11$$

$$0.8 < r_1/r_2 < 1.25.$$

2. An optical scanning lens according to claim 1, further comprising a face inclination lens arranged along said optical axis.

3. An optical scanning lens according to claim 2 wherein:

said face inclination lens is of a torroidal shape and comprises:

a first surface having a radius of curvature $r_{1x}$ along a main scan direction, and a radius of curvature $r_{1y}$ along a cross scan direction perpendicular to said main scan direction, and a second surface having a radius of curvature $r_{2x}$ along said main scan direction, and a radius of curvature $r_{2y}$ along said cross scan direction.

4. An optical scanning lens comprising:

a meniscus lens arranged along an optical axis of said optical scanning lens including a first surface having a radius of curvature $r_1$, and a second surface having a radius of curvature $r_2$; and a positive meniscus lens arranged along the optical axis of said optical scanning lens;

wherein:

said meniscus lens has a focal length of $f_1$, said positive meniscus lens is arranged sequentially after said meniscus lens and has a focal length of $f_2$, and said meniscus lens and said positive meniscus lens have an fθ function and correct a field curvature in a main scan direction, and satisfy the relationship:

$$-0.02 < f_2/f_1 < 0.36$$

$$0.85 < r_1/r_2 < 1.25.$$

5. An optical scanning lens according to claim 4, further comprising a face inclination lens arranged along said optical axis.

6. An optical scanning lens according to claim 5, wherein:

said face inclination lens is of a torroidal shape and comprises:

a first surface having a radius of curvature $r_{1x}$ along said main scan direction, and a radius of curvature $r_{1y}$ along a cross scan direction perpendicular to said main scan direction, and a second surface having a radius of curvature $r_{2x}$ along said main scan direction, and a radius of curvature $r_{2y}$ along said cross scan direction.

7. An optical scanning lens according to claim 6, wherein said meniscus lens is constructed of a plastic material.

8. An optical scanning lens according to claim 5, wherein said meniscus lens is constructed of a plastic material.

9. An optical scanning lens according to claim 4, wherein said meniscus lens is constructed of a plastic material.

10. An optical scanning lens according to claim 4, wherein said first surface of said meniscus lens is an aspheric surface.

11. An optical scanning lens according to claim 10, further comprising a face inclination lens arranged along said optical axis.

12. An optical scanning lens according to claim 11, wherein said meniscus lens is constructed of a plastic material.

13. An optical scanning lens according to claim 10, wherein said meniscus lens is constructed of a plastic material.

14. An optical scanning lens according to claim 4, wherein said second surface of said meniscus lens is an aspheric surface.

15. An optical scanning lens according to claim 14, further comprising a face inclination lens arranged along said optical axis.

16. An optical scanning lens according to claim 15, wherein said meniscus lens is constructed of a plastic material.

17. An optical scanning lens according to claim 14, wherein said meniscus lens is constructed of a plastic material.

18. An optical scanning lens according to claim 4, wherein:

said first surface of said meniscus lens is an aspheric surface; and said first surface of said positive meniscus lens is an aspheric surface.

19. An optical scanning lens according to claim 18, further comprising a face inclination lens arranged along said optical axis.

20. An optical scanning lens according to claim 19, wherein said meniscus lens and said positive meniscus lens are constructed of a plastic material.

21. An optical scanning lens according to claim 18, wherein said meniscus lens and said positive meniscus lens are constructed of a plastic material.

22. An optical scanning lens according to claim 4, wherein:

said second surface of said meniscus lens is an aspheric surface; and said first surface of said positive meniscus lens is an aspheric surface.

23. An optical scanning lens according to claim 22, further comprising a face inclination lens arranged along said optical axis.

24. An optical scanning lens according to claim 23, wherein said meniscus lens and said positive meniscus lens are constructed of a plastic material.

25. An optical scanning lens according to claim 22, wherein said meniscus lens and said positive meniscus lens are constructed of a plastic material.

26. An optical scanning lens according to claim 4, wherein:

said second surface of said meniscus lens is an aspheric surface; and said second surface of said positive meniscus lens is an aspheric surface.

27. An optical scanning lens according to claim 26, further comprising a face inclination lens arranged along said optical axis.

28. An optical scanning lens according to claim 27, wherein said meniscus lens and said positive meniscus lens are constructed of a plastic material.

29. An optical scanning lens according to claim 26, wherein said meniscus lens and said positive meniscus lens are constructed of a plastic material.

30. A scanning device, comprising:

a light source;

an optical scanning lens comprising, a meniscus lens arranged along an optical axis of said optical scanning lens including a first surface having a radius of curvature $r_1$, and a second surface having a radius of curvature $r_2$, and a positive meniscus lens arranged along the optical axis of said optical scanning lens;

a deflector for deflecting light emitted by said light source into said optical scanning lens; and an image surface for capturing an image focused by said optical scanning lens;

wherein:

said meniscus lens has a focal length of $f_1$, said positive meniscus lens is arranged sequentially after said meniscus lens and has a focal length of $f_2$, and said meniscus lens and said positive meniscus lens have an fθ function and correct a field curvature in a main scan direction, and satisfy the relationship:

$-0.25 < f_2/f_1 < 0.11$ $0.8 < r_1/r_2 < 1.25$.

31. A scanning device according to claim 30, wherein:

said image surface is a photoconductive drum;

said light source emits a laser beam containing image data; and said scanning device is a printer.

32. A scanning device, comprising:

a light source;

an optical scanning lens comprising, a meniscus lens arranged along an optical axis of said optical scanning lens including a first surface having a radius of curvature $r_1$, and a second surface having a radius of curvature $r_2$, and a positive meniscus lens arranged along the optical axis of said optical scanning lens;

a deflector for deflecting light emitted by said light source into said optical scanning lens; and an image surface for capturing an image focused by said optical scanning lens;

wherein:

said meniscus lens has a focal length of $f_1$, said positive meniscus lens is arranged sequentially after said meniscus lens and has a focal length of $f_2$, and said meniscus lens and said positive meniscus lens have an fθ function and correct a field curvature in a main scan direction, and satisfy the relationship:

$-0.02 < f_2/f_1 < 0.36$ $0.85 < r_1/r_2 < 1.25$.

33. A scanning device according to claim 32, wherein:

said image surface is a photoconductive drum;

said light source emits a laser beam containing image data; and said scanning device is a printer.

* * * * *